United States Patent Office 3,451,907
Patented June 24, 1969

3,451,907
PHOTOCHEMICAL PROCESS FOR PREPARING OXYGEN-CONTAINING PERFLUORINATED COMPOUNDS
Dario Sianesi, Gian Carlo Bernardi, and Adolfo Pasetti, Milan, Italy, assignors to Montecatini Edison S.p.A., Milan, Italy
No Drawing. Filed Nov. 18, 1966, Ser. No. 595,340
Claims priority, application Italy, Nov. 18, 1965, 25,551/65
Int. Cl. B01j 1/10; C07d 1/06
U.S. Cl. 204—158                      4 Claims The present invention relates to the fluoride of perfluorocrotonic acid and to other new perfluorinated compounds essentially consisting of C, F and O atoms, and to the process for their preparation. This process is essentially based upon a reaction of oxygen with perfluorobutadiene alone or in admixture with other fluoroolefins.

Copending U.S. patent application Ser. No. 446,292, filed Apr. 7, 1965 describes a photochemical reaction, in the liquid phase, of a perfluoromonoolefin, more particularly of perfluoropropylene, with molecular oxygen by irradiation with U.V. light of the liquid monomeric phase saturated with oxygen. This reaction can be carried out continuously or batchwise, by keeping the perfluoroolefin or perfluoroolefins in the liquid phase, by using pure oxygen or a gas containing molecular oxygen under atmospheric pressure, in the presence or absence of liquid solvent or dispersing means, activators, photosensitizers, modifiers, etc. The olefins which may be employed in the invention of this copending application are preferably perfluoroolefins with a terminal double bond, such as perfluoropropylene, perfluorobutene-1, perfluorohexene, etc., or mixtures thereof with each other and with perfluoroethylene.

We have now found that perfluorobutadiene, or another perfluorinated diene having conjugated terminal double bonds, either alone or in admixture with perfluoropropylene or with other fluorinated olefins, reacts with molecular oxygen, in liquid phase, if the reaction is activated by U.V. radiations having a wavelength between 1000 and 4000 A.

More particularly our present invention relates to the fluoride of perfluorocrotonic acid and its derivatives essentially consisting of C, F and O atoms, that might be described as fluoride of perfluorocrotonic acid and its derivatives of the formula

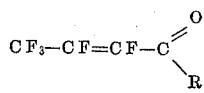

wherein R is selected from the group consisting of OH, NH$_2$, alkoxy radicals and OMe, wherein Me is the equivalent of a metal, to polymeric perfluorinated compounds having the general formula $(C_4F_6O_x)_n$ in which $n$ is a whole number from 2 to 100 and $x$ is a number from 1 to 3, and to other copolymeric perfluorinated compounds. These compounds are obtained by reaction in liquid phase of one or more perfluorinated compounds having conjugated terminal double bonds with molecular oxygen, used alone or in a admixture with an inert gas, and activated by U.V. light having a wavelength between 1000 and 4000 A., at temperatures between −78° C. and +50° C., preferably between −70° C. and +10° C., under pressures between 0.1 and 10 atm., preferably around atmospheric pressure. More particularly, the dienically unsaturated perfluorinated compound is perfluorobutadiene per se or in admixture with perfluoropropylene. The U.V. irradiation can be maintained during the entire reaction or stopped as soon as the reaction commences. In the latter case, the reactions proceed spontaneously, that is without any additional exterior activation, until high degrees of conversions to products of the same type as those obtained by continuous irradiation are obtained.

This fact is particularly surprising, since control tests, carried out under the same conditions but without a previous photochemical activation, did not show any reaction of this type between perfluorobutadiene and oxygen.

The reaction product consists of a mixture of new compounds consisting only of C, F and O atoms, having low and high molecular weight, which can be separated by fractional distillation of the mixture. When starting with perfluorobutadiene alone, the main low molecular weight product obtained is the fluoride of perfluorocrotonic acid,

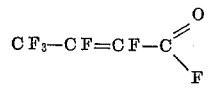

other low molecular weight compounds have the elemental composition and the I.R. absorption characteristics (in the zone of 6.4μ) of the monoepoxide and of the diepoxide of perfluorobutadiene, although their structures have not yet been identified with certainty. Small amounts of decomposition compounds, such as carbonyl fluoride and the fluoride of perfluoroacrylic acid have also found in the reaction product. If perfluoropropene is reacted in addition to perfluorobutadiene, low molecular weight products deriving from the oxidation of the former, more particularly the epoxide C$_3$F$_6$O, are also formed.

The higher molecular weight components of the reaction product are liquids consisting of a mixture of low polymers the viscosity of which increases with increasing molecular weight. The molecular weights of the components of the mixture are between 400 and 15,000. The lower molecular weight fractions can be distilled off at temperatures between about 100° C. to and about 350° C. under reduced pressure. The remaining polymers cannot also be distilled under a high vacuum because at higher temperatures alteration and decomposition occur. The residue has the appearance of an exceptionally viscous oil or the appearance and consistency of a non-vulcanized rubber.

All the polymeric products are totally miscible with perfluorinated and chlorofluorinated solvents; on the other hand they are not soluble in the usual organic solvents. The polymeric products obtained from perfluorobutadiene alone have the general formula $$(C_4F_6O_x)_n$$

wherein $n$ is an integer from 2 to 100 and $x$ varies from 1 to 3. The polymeric products have a remarkably complex structure depending on the systhesis conditions. For instance, heating these products to above 350° C. reduces their oxygen content.

The high molecular weight reaction products generally contain acid fluoride groups, —COF, which can be observed in the I.R. spectrum on the basis of the absorption at 5.30μ, and can be titrated with an alkali solution. Their I.R. absorption spectrum also shows the presence of double bonds, C=C, absorptions at 5.55μ and at 5.80μ, and of epoxy groups,

absorption at 6.55μ.

Depending on the synthesis conditions, the acidimetric equivalent weight, (g. sample)/(total acid equivalents minus F$^-$ equivalents), varies between $10^2$ and $10^4$. This is independent of the effective value of the average molecular weight. In other words, these polymers can contain acid functions linked to the side groups of the single units forming the chain. The main chain preferably contains acid terminal groups.

When the average acidimetric equivalent weight is towards the lower end of the foregoing range, the polymers, even if they have a high molecular weight, are completely soluble in water or in alkaline solution. These products, with respect to hydroiodic acid, having an oxidizing activity corresponding to an active oxygen content between 1 and 5 g. of active oxygen per 100 g. of product.

On the basis of available data, the liquid products obtained by starting with perfluorobutadiene are considered as consisting of a succession of —CF$_2$—CFR— units bound to each other through bridges of ether (—O—) type or also of peroxide (—O—O—) type. In the preceding formula R can be

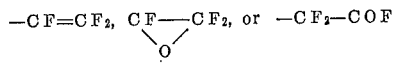

Units of the various types can be present at the same time in the chain and distributed at random. Structural units —CF$_2$—CF=CF—CF$_2$— bound to the other units of the chain through ether or peroxide bridges can also be present.

It has been found that in polymeric products containing a remarkable proportion of

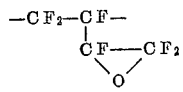

units, it is possible to carry out the transformation of these units into the isomeric units

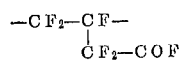

by heating at temperatures between 100° and 200° C. This observation supports the hypothesis that the units carrying a side acid fluoride group present in the final reaction product are actually the result of a more or less pronounced isomerization of the previously formed units containing an epoxy group. On the other hand, these last C$_4$F$_6$O units in turn are probably derived from the oxidation of the units

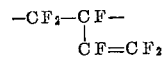

which initially are present in the chain.

The polymeric products obtained by photooxidation of perfluorobutadiene in admixture with perfluoropropylene, have a composition analogous to that illustrated above, but also contain the units

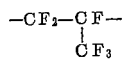

deriving from the monoolefin and linked to the other units as described.

By a suitable selection of the starting monomeric composition it is thus possible to obtain "copolymeric" products having varied ratios between the different units forming the chain, according to the well-known principles of copolymerization. They may be described as having a molecular weight of the order of magnitude between $10^2$ and $10^4$ and consisting of molecules containing a statistical distribution of repeating units A and B, bound to each other in ratios of from 1:99 to 99:1, in which A has the formula (C$_4$F$_6$O$_x$) and B has the formula (C$_3$F$_6$O$_y$) and wherein $x$ varies between 1 and 3 and $y$ varies between 1 and 2.

The fluoride of perfluorocrotonic acid contains a reactive acid group and is therefore suitable for the synthesis of various derivatives. Moreover the presence of a double bond renders it useful in the synthesis of modified fluorinated polymers.

The high molecular weight compounds derived from the reaction with oxygen or perfluorobutadiene, or of mixtures thereof with perfluoropropylene, can find use as fluids of high thermal stability, intermediates for elastomeric products, etc. Moreover, they contain reactive positions in the chain, such as double bonds, epoxy groups and acid groups in a high proportion and can therefore be subjected to further transformations even if they have a high intrinsic thermal stability. They can also be used as surface-active agents and emulsifiers, polyelectrolytes in aqueous solution and for treatments imparting oil-repellent properties.

The following examples are to further illustrate the invention without limiting it beyond the scope of the appended claims.

EXAMPLE 1

A reactor consisting of a quartz vial having a 50 cc. capacity, provided with a dipping tube for the introduction of oxygen and with a reflux condenser kept at —80° C. through which the excess of non-absorbed oxygen escapes was used. The escaping gas is washed with a 20% KOH solution and collected in a 5-liter gasometer. A pump recycled the oxygen, thus purified and dried, to the reactor together with additional make-up oxygen to replace the amount of oxygen consumed during the reaction.

At the beginning of the reaction 40 g. of perfluorobutadiene were introduced into the reactor. During the entire reaction, the reactor was kept at a constant temperature of +3° C. by means of an outer water bath. A 70-watt U.V. lamp of the Hanau Q81 type was immersed in the same bath, at a distance of 3 mm. from the reactor wall. The lamp was activated during the entire reaction time, namely 4 hours. During this period of time 3,660 N ml. of oxygen were absorbed, the oxygen being bubbled through the liquid at the flow rate of about 10 l./h. At the end of the reaction, the mixture thus obtained was subjected to fractional distillation under atmospheric pressure to give:

3 g. of unreacted perfluorobutadiene (B.P. +6° C.),
22 g. of the fluoride of perfluorocrotonic acid (B.P. 37–38° C.), and
15 g. of an oily residue, not distillable below 100° C., plus small amounts of other low-boiling substances.

The fluoride of perfluorocrotonic acid,

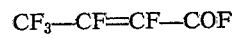

was identified through acidimetry, molecular weight, I.R. spectrum, NMR spectrum and by preparation of derivatives (ethyl ester, boiling point 116.5°–117° C. under atmospheric pressure, and amide, melting point 131–132° C.). The last two compounds were characterized through elemental composition and I.R. spectrography.

The polymeric oily residue, contained 10.0% by weight of a fraction which was distilled up to 200° C./0.5 mm. Hg. The distillation residue had an elemental composition corresponding to the formula (C$_4$F$_{5.90}$O$_{1.74}$)$_n$. Its I.R. spectrum was recorded. A sample of 1.25 g. of this product was dissolved in 5 cc. of perfluorodimethylcyclobutane and the solution thus obtained is slowly added dropwise to 200 cc. of 0.1 N NaOH solution while vigorously agitating for a period of 3 hours at room temperature. The excess alkali was then titrated, with phenolphthalein indicator, with 88 cc. of 0.1 N HCl. On this solution the presence of 0.10 g. of F$^-$ was then determined. The acidimetric equivalent weight therefore is 212.

EXAMPLE 2

In an apparatus similar to that described in Example 1, but in which the 50 cc. quartz vial was replaced by a similar 100 cc. vial, 94 g. of perfluorobutadiene were introduced. While bubbling oxygen at the flow rate of 18 l./h., the vial was irradiated and kept at 0° C. After irradiation for 8 minutes, 400 Nml. of oxygen were found to be absorbed. The lamp was then deactivated and the reaction continued for 10 hours without irradiation so as to absorb a total of 3,700 Nml. of oxygen. The mixture thus obtained is then subjected to fractional distillation to give:

52 g. of unreacted perfluorobutadiene, 2 g. of a mixture of compounds, having a distillation range between 12 and 34° C., with an average molecular weight between 178 and 194, with a combined oxygen content between 9% and 16.5% and having an intense I.R. absorption in the zone of 6.4/6.6μ (probably a mixture of epoxides of perfluorobutadiene), 18 g. of the fluoride of perfluorocrotonic acid, and 18.5 g. of a polymeric oil, undistillable below 110° C. under atmospheric pressure.

The above polymer was characterized by an elemental composition corresponding the formula $(C_4F_{5.37}O_{2.20})_n$. Its active oxygen content, determined by iodometry, was 4.62% by weight (this determination was carried out by dissolving 0.5 g. of substance in 10 cc. of $$CF_2-Cl-CF-Cl_2$$

adding 2 g. of NaI dissolved in 20 cc. of acetic anhydride; agitating the whole at room temperature for 2 hours and then titrating the freed iodine amount with a standard thiosulfate solution). The acidimetric equivalent weight was 204.1. The I.R. spectrum of the product was recorded, showing absorption bands due to epoxy groups, acid fluoride groups and difluorinated double bonds.

EXAMPLE 3

45 g. of perfluorobutadiene were introduced into an apparatus analogous to that described in Example 1, but with the reactor modified so that the lamp was immersed in the liquid within the reactor.

The contents of the reactor were cooled to −78° C. by means of an outer Dry Ice/acetone bath. Oxygen was bubbled through the liquid diolefin at the flow rate of about 20 l./h. The bubbling was continued over a 10-hour period without evidence of reaction during this period.

The lamp (of the usual type, high pressure Q81 Hanau) was then activated and the reaction continued for 3 hours and 30 minutes. In total, 3,925 Nml. of oxygen were absorbed during this period. The mixture obtained was subjected to fractional distillation to give:

4 g. of epoxides of perfluorobutadiene, 9 g. of perfluorocrotonyl fluoride, 11.5 g. of low polymers distillable below 210° C., and 19 g. of polymeric oil, undistillable up to 210° C.

This polymer is characterized by a centesimal composition corresponding to the formula $(C_4F_{5.86}O_{1.55})_n$. The active oxygen content determined iodometrically was 1.45% by weight, the acidimetric equivalent weight was 870, and the infrared spectrum was characterized by bands showing the presence of epoxy groups

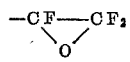

and of functions —COF.

By heating to 200° C. for 4 hours, this oily product was transformed and took on the appearance of a non-vulcanized elastomer. After this treatment, the I.R. spectrum showed a decreased presence of epoxy groups and a corresponding increase of —CF$_2$—COF groups.

EXAMPLE 4

90 g. of perfluoropropylene and 31 g. of perfluorobutadiene were introduced into the apparatus described in the preceding example.

While cooling the reactor with an outer Dry Ice/acetone bath and circulating oxygen, the reactor was irradiated with the same lamp as described in the preceding example for 2 hours and 20 minutes.

In total, 7,060 Nml. of oxygen were absorbed. The mixture obtained was subjected to fractional distillation to give:

55.5 g. of unreacted perfluoropropylene, 2.5 g. of a mixture of epoxides of the two perfluoroolefins used, 0.2 g. of perfluorocrotonyl fluoride, 5.3 g. of low polymers distillable below 240° C. under the residual pressure of 8 mm. Hg, and 60.4 g. of a residual polymeric oil.

This last oil had an elemental composition corresponding to a formula $(C_{3.5}F_6O_{1.65})_n$; an active oxygen content, determined by iodometry, of 2.85% by weight; an acidimetric equivalent weight of 388. On the basis of these data and of the I.R. absorption spectrum, the structure of this product can be represented by a succession, in approximately equal number of

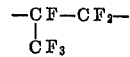

and

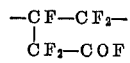

units connected by ether or peroxide bridges in ratios of about 5:1.

The same polymeric oil, when subjected to distillation under a residual pressure of 0.5 mm. Hg up to 340° C., gave 40 g. of an oily distillate, and a non-distillable residue of 15.5 g. remained.

Both these fractions were found to be completely soluble in water and in alkali solutions. By strong acidification of these solutions the polymer precipitated again in the form of a viscous oil; from the I.R. spectrum it appeared that all —COF groups were thus hydrolyzed into —COOH groups.

We claim:

1. A process of reacting in the liquid phase at least one perfluorinated compound having conjugated terminal double bonds with molecular oxygen by activating with U.V. light having a wavelength between 1000 and 4000 A., at a temperature between −78° and +50° C., under pressures between 0.1 and 10 atmospheres.

2. The process of claim 1 wherein the reaction temperature is between −70° and +10° C. and the reaction pressure is about atmospheric.

3. The process of claim 2 wherein the unsaturated perfluorinated compound is perfluorobutadiene.

4. The process of claim 2 wherein a mixture of perfluorobutadiene and perfluoropropylene is used.

References Cited

UNITED STATES PATENTS

| | | | |
|---|---|---|---|
| 2,795,601 | 1/1956 | Rendall et al. | 260—486 X |
| 2,863,906 | 12/1958 | Baranauckas et al. | 260—486 |
| 3,151,051 | 9/1964 | Braid et al. | 204—158 |

HOWARD S. WILLIAMS, *Primary Examiner.*

U.S. Cl. X.R.

260—486